United States Patent [19]
Nakai et al.

[11] Patent Number: 5,655,052
[45] Date of Patent: Aug. 5, 1997

[54] REPRODUCTION APPARATUS WITH A TIME DISPLAY FUNCTION

[75] Inventors: Masatoshi Nakai; Mitsutaka Kuwabara, both of Fukaya, Japan

[73] Assignee: Kabushiki Kaisha Toshiba, Kawasaki, Japan

[21] Appl. No.: 330,630

[22] Filed: Oct. 28, 1994

[30] Foreign Application Priority Data

Oct. 29, 1993 [JP] Japan ................................ 5-271642

[51] Int. Cl.$^6$ .............................. H04N 5/76; H04N 7/08
[52] U.S. Cl. ..................... 386/106; 386/125; 386/126
[58] Field of Search ................................ 358/342, 341; 360/48

[56] References Cited

U.S. PATENT DOCUMENTS

| | | | |
|---|---|---|---|
| 4,727,446 | 2/1988 | Kaaden | 360/137 |
| 5,047,999 | 9/1991 | Van Der Meulen | 369/32 |
| 5,140,437 | 8/1992 | Yonemitsu et al. | 358/342 |
| 5,239,382 | 8/1993 | Hatakenaka et al. | 358/335 |
| 5,325,239 | 6/1994 | Hoogendoom et al. | 360/48 |
| 5,363,250 | 11/1994 | Lokhoff et al. | 360/48 |
| 5,452,096 | 9/1995 | Ito | 358/311 |

FOREIGN PATENT DOCUMENTS 0275199  7/1988  European Pat. Off. .

OTHER PUBLICATIONS

Patent Abstracts of Japan, vol. 16, No. 197 (P–1350) May 12, 1992 & JP-A-04 028 077 (Matsushita Electric Ind Co. Ltd.) Jan. 30, 1992.

Patent Abstracts of Japan, vol.14, No. 472 (P–1116) Oct. 15, 1990 & JP-A-02 187 979 (Sharp Corp) Jul. 24, 1990.

Patent Abstracts of Japan, vol. 8, No. 65 (P–263) Mar. 27, 1984 & JP-A-58 212 692 (Matsushita Denki Sangyo KK) Dec. 10, 1983.

Patent Abstracts of Japan, vol. 16, No. 220 (P–1358) May 22, 1992 & JP-A-04 042 487 (Sony Corp) Feb. 13, 1992.

Patent Abstracts of Japan , vol. 16, No. 80 (P–1318) Feb. 26, 1992 & JP-A-03 268 288 (Sanyo Electric Co Ltd) Nov. 28, 1991.

*Primary Examiner*—Tommy P. Chin
*Assistant Examiner*—Luanne P. Din
*Attorney, Agent, or Firm*—Cushman, Darby & Cushman IP Group of Pillsbury Madison & Sutro LLP

[57] ABSTRACT

Display is made according to the user's request by using the time information recorded on the disk. A disk contains a management area in which management data is recorded and a data area in which programs are recorded. Recorded in the management area are the absolute time information on the starts of the programs and the in-program relative time information on the starts of data units constituting each program. In the absolute time display mode, the absolute time information for display is obtained from the absolute time information on the program being reproduced and the relative time information on the data unit of the program being reproduced. In the relative time display mode, the absolute time information of the program being reproduced is set at 0, and the absolute time information for display is obtained from the relative time information on the data unit of the program being reproduced. In the frame number display mode, the frame information on the output image is counted and the current frame number is determined.

6 Claims, 8 Drawing Sheets

STRUCTURE OF MANAGEMENT TABLE

| TYPE | DATA LAYOUT |
|---|---|
| VID | (256 BYTE) x 1 |
| PIF | (16 BYTE) x NUMBER OF PROGRAM |
| DAT | (8 BYTE) x NUMBER OF DATA UNITS |

FIG. 4A

PROGRAM INFORMATION FIELD (PIF)

| PARAMETER | DESCRIPTION | NUMBER OF BYTES USED |
|---|---|---|
| ATMB | ABSOLUTE STARTING TIME | 2 BYTES |
| PINF | PROGRAM ATTRIBUTE | 1 BYTE |
| GINF | GOP COMPONENT ATTRIBUTE | 1 BYTE |
| EINF | EXPANSION CODE ELEMENT | 1 BYTE |
| AINF | AUDIO ENCODING SYSTEM | 1 BYTE |
| VINF | VIDEO ENCODING SYSTEM | 1 BYTE |
| ATRP | PICTURE ATTRIBUTE | 1 BYTE |
| HRES | HORIZONTAL RESOLUTION | 2 BYTES |
| VRES | VERTICAL RESOLUTION | 2 BYTES |
| PNTB | STARTING POINTER | 2 BYTES |
| PGML | PROGRAM LINK | 2 BYTES |

FIG. 4B

DATA-UNIT ALLOCATION TABLE (DAT)

| PARAMETER | DESCRIPTION | NUMBER OF BYTES USED |
|---|---|---|
| NZON | ZONE NUMBER | 1 BYTE |
| NSCT | SECTOR NUMBER | 1 BYTE |
| NTRC | TRACK NUMBER | 2 BYTES |
| PTMB | PROGRAM TIME | 2 BYTES |
| PNTL | LINK POINTER | 2 BYTES |

FIG. 4C

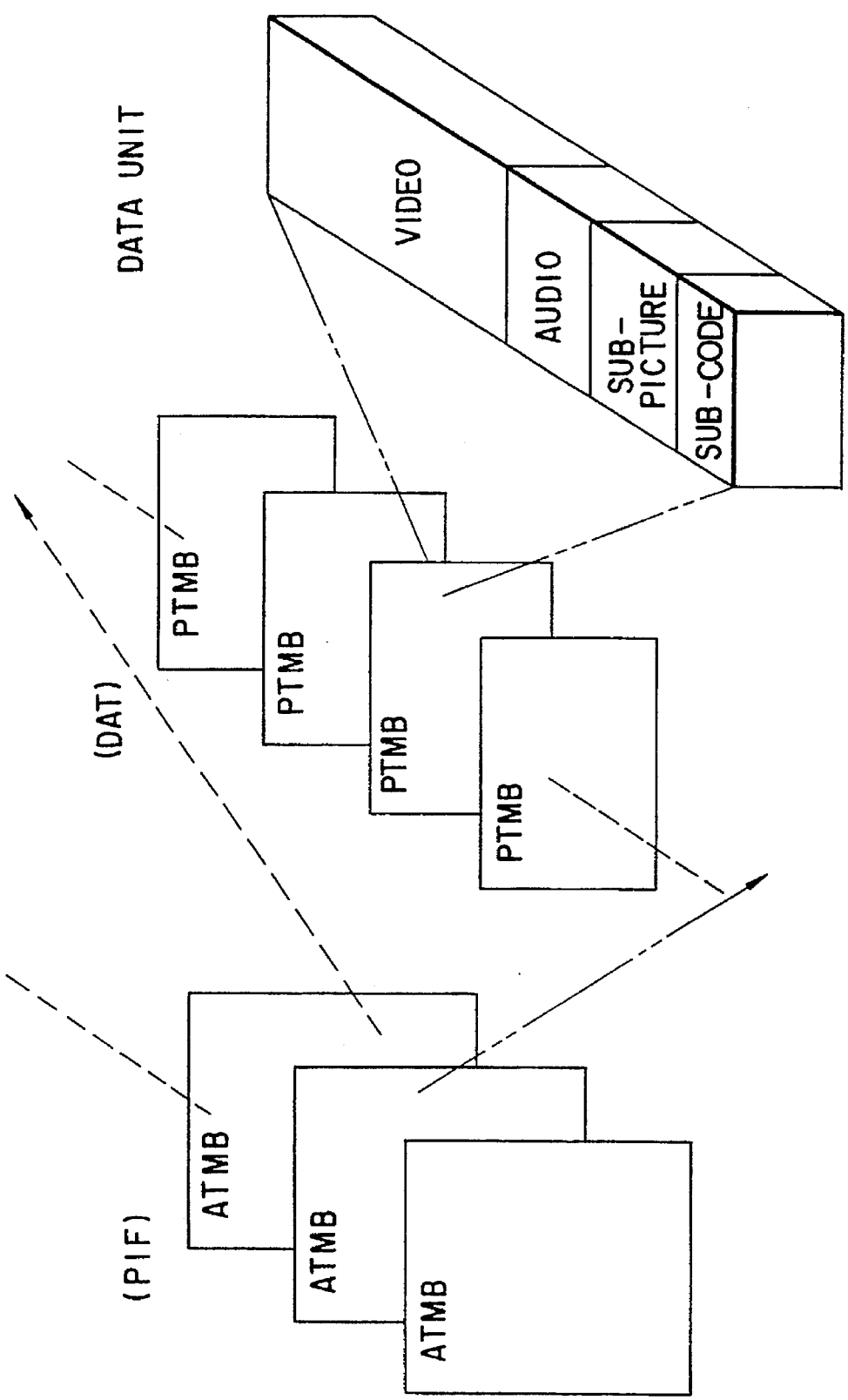
F I G. 7

FIG. 8A

```
PLAY PROGRAM    NO.15 AT 92:07
```

EXAMPLE OF ABSOLUTE TIME DISPLAY

FIG. 8B

```
PLAY PROGRAM    NO.15 RT 03:18
```

EXAMPLE OF RELATIVE TIME DISPLAY

FIG. 8C

```
PLAY PROGRAM    NO.15 F165810
```

EXAMPLE OF FRAME NO. DISPLAY 5,655,052

REPRODUCTION APPARATUS WITH A TIME DISPLAY FUNCTION

BACKGROUND OF THE INVENTION

1. Field of the Invention

This invention relates to a reproduction apparatus capable of recording and reproducing a program, such as a movie, on a recording medium, such as an optical disk or a CD-ROM, and more particularly to a reproduction apparatus with a time display function.

2. Description of the Related Art

Since such recording mediums as magnetic disks or optical disks enable high-speed data access, though they have a smaller memory capacity than magnetic tape, they facilitate the reading, the transferring, and the head-locating of a program of moving-picture data. Recent advances in high-efficiency coding technology for image data have made it possible to store many programs, and recording and reproduction systems using such disks as recording mediums will find their way into a wider variety of applications. Such moving-picture compression recording techniques include a system prescribed by ISO-11172 (MPEG).

As the increased amount of recording information enables the use of more programs, a desire to check for the elapsed time during reproduction is getting stronger. In displaying the reproduction elapsed time, it is desired that the reproduction elapsed time for more than one program or the time elapsed for the program now being reproduced appears on the screen. It is also desired that the remaining time for the current program is displayed during reproduction.

SUMMARY OF THE INVENTION

Accordingly, the object of the present invention is to provide a reproduction apparatus with a time display function capable of producing a time display by request on the basis of the time information recorded on the disk.

The foregoing object is accomplished by providing a reproduction apparatus with a time display function, comprising: a disk in which a management area is formed in a portion of the disk and a data area is formed in another portion of the disk, a plurality of programs being recorded in the data area, each of the plurality of programs being composed of a plurality of data units, each of the data units containing video information, and absolute time information on the starts of the plurality of programs and relative time information within the programs on the starts of the plurality of data units being recorded in the management area; pickup means for reading the information from the disk; demodulation means for demodulating the output signal of the pickup means; management information storage means for storing each piece of information in the management area outputted from the demodulation means; video decode means for decoding video information on the data unit outputted from the demodulation means; time information processing means for, in an absolute time display mode, obtaining absolute time information for display from the absolute time information on the program being reproduced and the relative time information on the data unit of the program being reproduced, and in a relative time display mode, obtaining relative time information for display from relative time information on the data unit of the program being reproduced with the absolute time information on the program being reproduced being set at 0, and in a frame number display mode, identifying the present frame number by counting frame information on the output image; and display means for displaying the display signal obtained from the time information processing means.

The above means combine to enable the user to obtain information on the program is now running, such as its remaining time, etc.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A to 4C show management tables for explaining the types of data in the data management area recorded on a disk associated with the invention;

FIG. 7 graphically shows a management table for explaining the operation of the apparatus of the invention; and FIGS. 8A to 8C are views of what is displayed on the screen in the apparatus of the invention.

DETAILED DESCRIPTION OF THE PREFERRED EMBODIMENTS

Hereinafter, embodiments of the present invention will be described, referring to the accompanying drawings.

Figure 1:
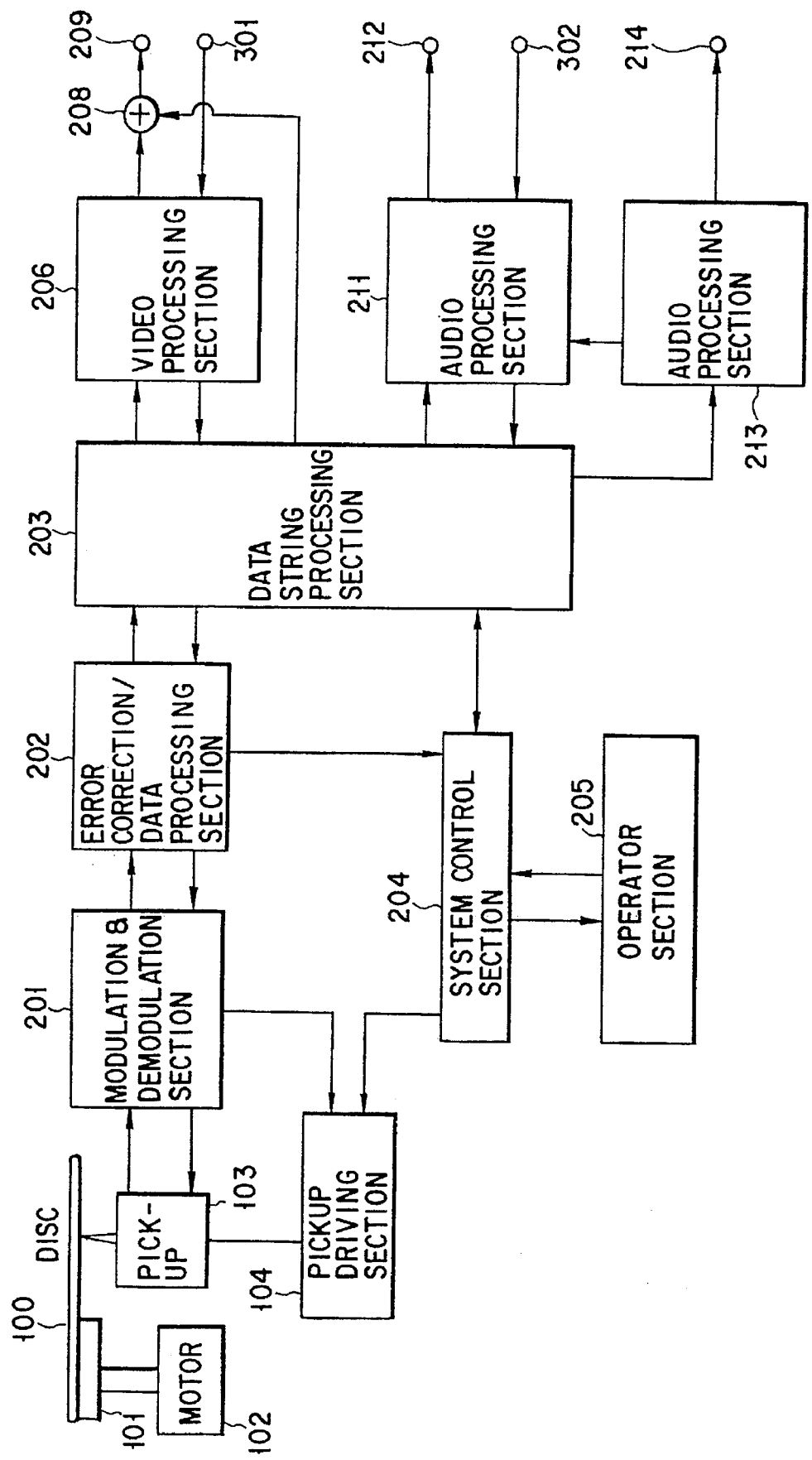
FIG. 1 is a block diagram of a reproduction apparatus according to an embodiment of the present invention.

In FIG. 1, a recording medium 100 such as an optical disk (hereinafter, referred to as a disk) of the present invention is installed in a recording and reproduction apparatus (accessing apparatus).

The disk 100 is placed on a turntable 101, which is rotated by a motor 102. In the reproduce mode, the information recorded on the disk 100 is read by pickup means 103. A pickup driving section 104 provides movement and tracking control of the pickup means 103. The output of the pickup means 103 is supplied to a modulation and demodulation section 201, which demodulates the supplied signal. The demodulated data is supplied to an error correction/data processing section 202, which corrects errors and supplies the resulting signal to a data string processing section 203. The data string processing section 203 extracts video information, subtitle and character information, and audio information. On the disk 100, the subtitle and character information and audio information are recorded so as to correspond to the video information, as explained later. Here, various languages can be selected for the subtitle and character information and audio information. The selection is made under the control of a system control section 204. The user supplies the input from an operator section 205 to the system control section 204.

Furthermore, it is assumed that, for example, information on a movie is recorded on the disk 100. In this case, a plurality of scenes that the user can select are recorded. To deal with these scenes, the data string processing section 203, the system control section 204, and the operator section 205 in the reproduction apparatus constitute data string control means and scene select means according to the operation of the user.

The video information separated at the data string processing section 203 is supplied to a video processing section 206, which carries out a decode process according to the type of display unit. For example, the video information is converted into a suitable form for an NTSC, PAL, SECAM, or wide screen. The video signal decoded at the video processing section 206 is supplied to an adder 208, which adds it to the subtitle and character information and supplies the addition result at an output terminal 209. The audio information separated at the data string processing section 203 is supplied to an audio processing section 211, which demodulates it and supplies the demodulated signal at an output terminal 212.

The audio processing section acting as a decoding section, which contains an audio processing section 213 in addition to the audio processing section 211, can also reproduce speech in another language and supply this reproduced signal at an output terminal 214 (this function will be explained later).

The above apparatus can also record data. In a record operation, a recording video signal is supplied to an input terminal 301 and a recording audio signal is supplied to an input terminal 302. In this case, the video processing section 206 acts as a video encoder, and the audio processing section 211 serves as an audio encoder. The data string processing section 203 functions as a recording information formatter, and the error correction data processing section 202 acts as an error code adding section. The data thus processed is modulated at the modulation section 201 of the modulation and demodulation section 201 and the modulated signal is supplied to the pickup section 103.

As described above, the disk 100 used in this invention stores pieces of video information related to each other. With this disk, the reproduction apparatus can reproduce any one of the pieces of video information or change the reproducing state from one video to another during the operation, as specified by the user.

In addition, on the disk, information on various languages, audio information including music information and background sound information, and subtitle information in various languages are recorded so as to correspond to the video information. To determine which language information should be reproduced, the data string processing section 203, system control section 204, and operator section 205 constitute data string control means and scene select means.

The brief outlines of a disk used in the present invention, its recording format, and its application will be given below.

Figure 2A:
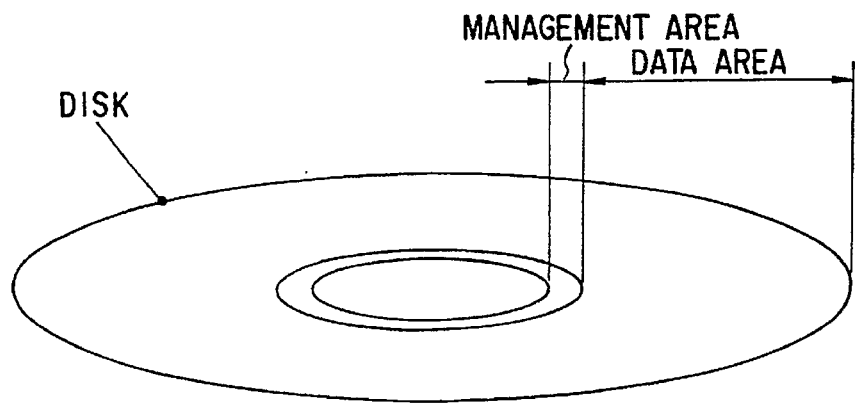
FIG. 2A illustrates an information area on a disk associated with the present invention and FIG. 2B is an explanatory diagram of the data format of the data recorded on a disk of the invention.

FIG. 2A shows the information area on the optical disk 100. The optical disk 100 has a management area on the inner side and a data area outside the management area. In the management area, management data for managing the programs in the data area is recorded as explained later. In the data area, information including subcode information, subpicture information, audio information, and video information is recorded.

First, the types of information are recorded in the data area will be explained, referring to FIG. 2B.

Figure 2B:
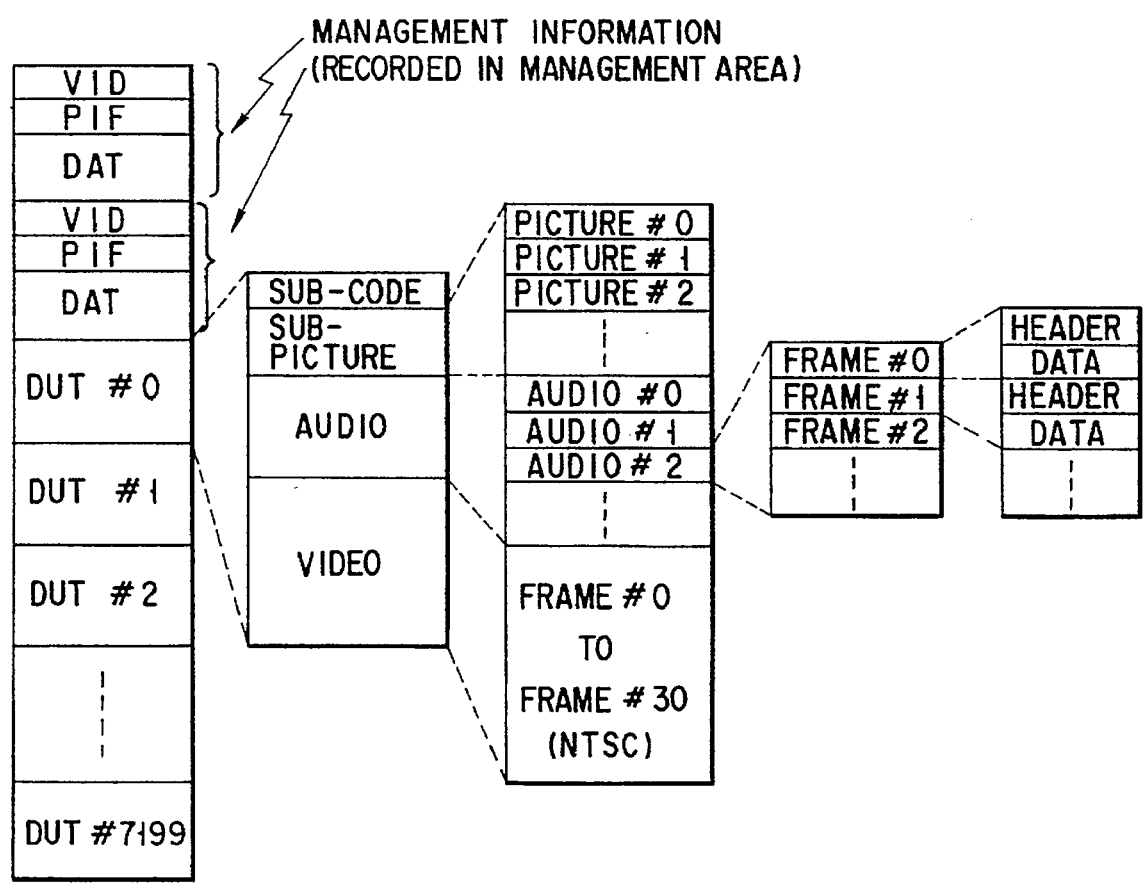

FIG. 2B is an enlarged view of the contents of data unit DUT #0 in the data area. In data unit DUT #0, there is a subcode (SUB-CODE) at the start, followed by a subpicture (SUB-PICTURE), audio information (AUDIO), and video information (VIDEO) in that order. The subcode (SUB-CODE) contains the attributes of data unit DUT #0. The subpicture (SUB-PICTURE) contains subtitle information (for movie video) or character information (for kara-OK video and educational video), for example. The subtitle information and the character information are each given PICTURE #0 through #4, all of which or some of which differ from each other in language and the rest contain no signals. The audio (AUDIO) information is recorded as music information or in five different languages, for example, in five languages AUDIO #0 through #4 (each reproduction lasts approximately one second). Each piece of AUDIO information is recorded in frames, each frame, #0, #1, . . . being composed of headers (HEADERs) and data (DATA). The video information (VIDEO) contains 30 frames of images (which will last approximately one second when reproduced), for example. The video (VIDEO) formation is recorded by high-efficiency image encoding techniques. The number of frames is not limited by standards. The audio information is also subjected to high-efficient encoding techniques.

Explained next will be the recording format of the video (VIDEO) information.

First, a moving-picture compression format will be described. When image data is encoded, groups of pictures (GOPs) are formed into a packet, and speech data (of approximately 1.0 sec) equivalent to a packet, the subcode, and the subpicture, are encoded. This encoded data is added to the compressed image data to form a data unit. Each GOP is fixed in the same program. An audio synchronizing time code is used as the subcode at the beginning of the expansion data of the data unit.

Figure 3A:
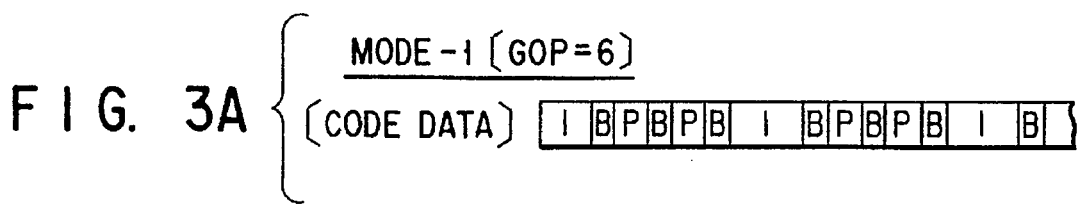
FIGS. 3A to 3C are diagrams to help explain a signal compression format in connection with the present invention.
Figure 3B:
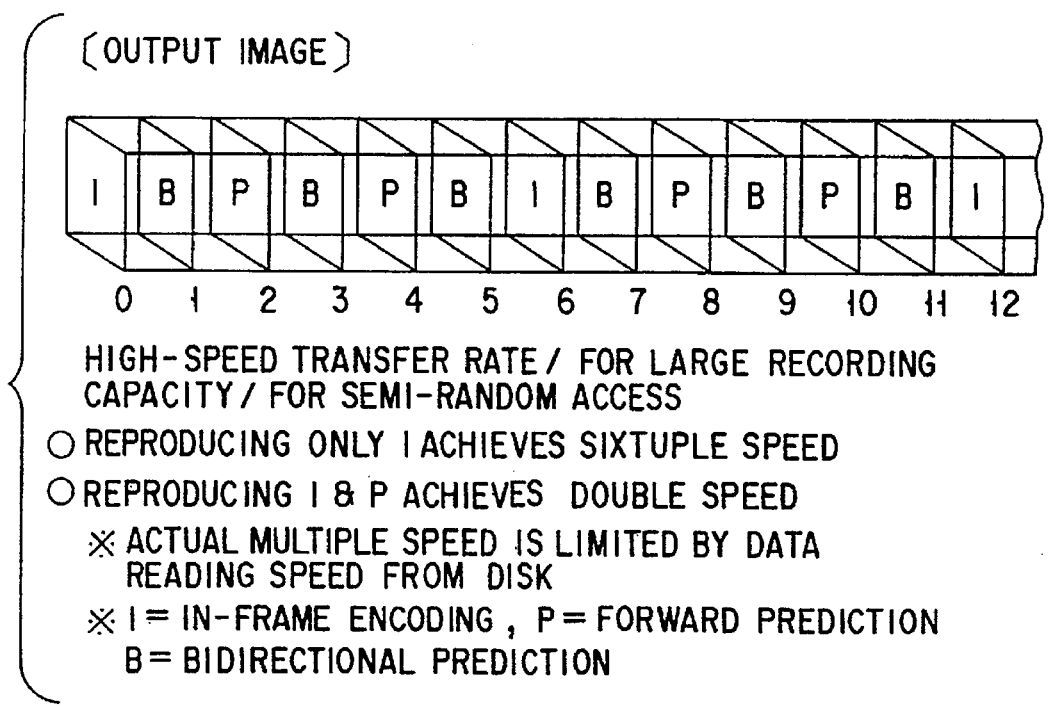
Figure 3C:
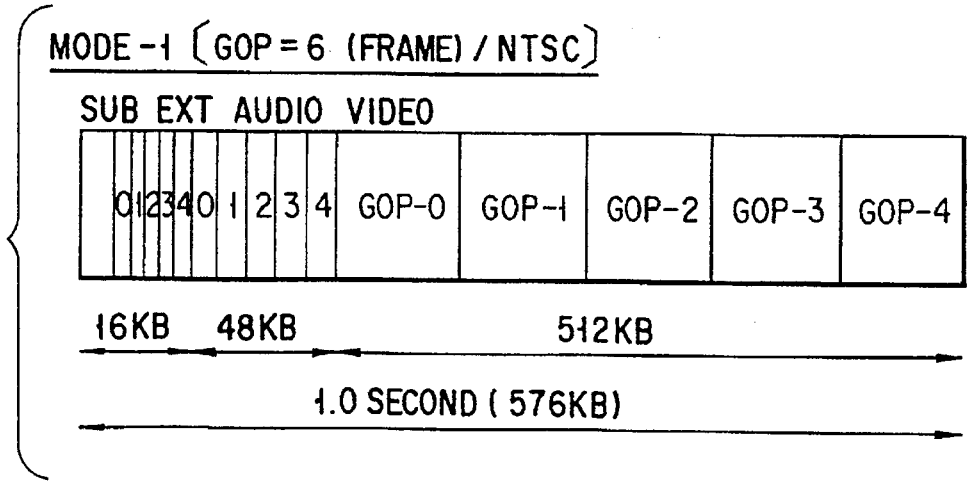

FIG. 3 graphically shows an example of the encoded data (FIG. 3A) and the output image (FIG. 3B) decoded from this data. In the figure, I indicates the image data encoded in a frame, P the image data encoded by forward prediction, and B the image data encoded by bidirectional prediction. In this mode, the image data is encoded repeatedly in this order: I, P, B, P, B. As a result, the length of the encoded data differs from frame to frame. With such a format, reproducing only I provides a sextuple-speed image, and reproducing I and P generates a double-speed image. The actual multiple speed is limited by the speed at which the data is read from the disk. This GOP structure is suitable for a high-speed transfer rate, a large recording capacity, and semi-random accessing. In this example, six frames are treated as a GOP. Then, as shown in FIG. 3C, five GOPs form a packet. This packet corresponds to one second of reproduction. The actual length of recorded signals on the disk differs from packet to packet since the signals are encoded by moving-picture compression techniques.

Therefore, a packet consists of 30 frames (=5 GOPs×6 frames/GOP). Each second of speech data is recorded in 48K bytes (=4 ch×12K bytes/s). When there are two channels used simultaneously, the minimum memory capacity needed may be 24K bytes.

The primary data item and the information rate for each data unit to be recorded on the disk are as follows:

Expansion data=128K bits/s=16K bytes/s
Speech data=384K bits/s=48K bytes/s
Image data=4096K bits/s=512K bytes/s The expansion data contains a subcode and subimage data. The subimage data can be used for subtitle information used in moving pictures. The subcode is individual management information in the data unit and also contains speech and image synchronizing information. The subimage data is updated on a GOP basis containing the corresponding main image. The synchronization of image and speech and the correction of synchronization are also carried out on a GOP basis.

For subtitle information, more than one channel may be provided for the subimage data so that two types of subimages can be selectively outputted as, for example, the English scenario and the Japanese subtitles on a foreign film. When the allocated rate of the subimage data is 64K bits/s, if the recording time of one packet is 1.0 second, the buffer memory capacity for holding the subimage data is approximately 64K bits. The buffer memory capacity needed for two channels of subimage may be 32K bits.

When each of the image, speech, and expansion data is encoded, they are completed within the data unit and are totally independent from other data units.

The management information recorded in the management area will be explained further. The management information is recorded in the form of a table.

Figures 5A, 5B:
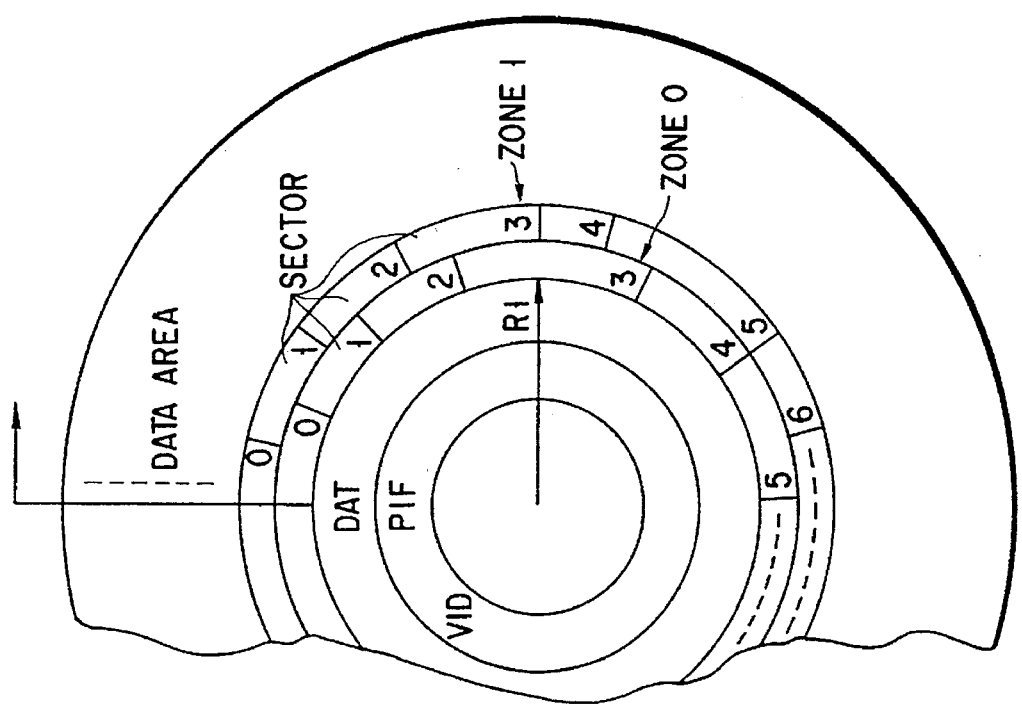
FIG. 5A illustrates a data layout of a disk associated with the invention.
FIG. 5B shows a data management table for the disk.

The management area, as shown in FIG. 5A, contains a volume identity field (VID) around the innermost circumference, a program information field (PIF) outside the VID, and a data unit allocation table (DAT) outside the PIF.

On the basis of the information in the management area, reading is done for each data unit. Because in this system, processing is effected independently for each data unit, it is easy to edit and access each data unit.

The relationship between the data area and the associated management information will be described.

In the actual layout, a byte align process is performed for each GOP, and a sector align process is always carried out for each data unit to make it easy to segment the data unit. In a reproduce operation, the image is encoded, beginning with the start frame of a GOP (I picture). The speech is encoded, beginning with the speech frame specified by the image synchronization. At the time when the decoding of both of the specified speech frame and the start frame of the image GOP has been completed, the image and the specified speech sample start to be outputted simultaneously.

For speech data, approximately 1.0 second of encoded speech data is inserted in the data unit. After a certain number of samples are grouped into a block with adjacent block edges tucked a little, the speech is encoded in units of this number of samples, and a header is added to the encoded speech to form an encoded speech frame.

The length of speech frame is less than the length of 2048 samples of the original speech, and corresponds a duration of 24 ms to 36 ms of the original speech. The encoded data amount of the speech frame ranges from 288 bytes to 576 bytes. A frame ID is added to the header of each speech frame in each speech channel. The frame ID is made up of 24 bits, 4 bits of which represent a speech channel and 20 bits of which indicate a speech frame number. The approximately 1.0 second of encoded speech data is usually as long as several tens of speech frames, though the length varies with the number of samples in a block and the sampling frequency. The image-sound synchronization added to the subcode specifies the frame number of the encoded speech to which the decoded speech sample to be outputted with the timing of outputting the start frame of the corresponding GOP, and the speech sample number in the frame. The time code consists of 32 bits, 20 bits of which represent a speech frame number and the remaining 12 bits of which specify a speech sample number. This enables the maximum error in the speech and image synchronization in the entire system to coincide with half the sampling period of speech. When fs=32 KHz, the maximum speech synchronization error is approximately 16 µs.

FIG. 4A shows the structure of the management table. The VID is written, starting at the first byte in the management table area, and indicates information on various elements throughout the disk by using 256 bytes. For example, this information includes information as to whether the disk is for general recording or for reproduction only.

In the program information field (PIF), various pieces of information on each program are recorded. For example, 16 bytes are used for each program.

FIG. 4B shows an example of the contents of 16 bytes in the PIF.

ATMB indicates the absolute time of the starting point of the present program in the volume. In the case of time code search, each item of ATMB data is checked in the order of reproducing programs to find the number of the program in which a desired time code is present. Each DAT (explained later) in the corresponding program is checked. Then, the sum of the program time (PTMB, explained later) and the ATMB is compared with the desired time code value to find the DAT to which the corresponding time code belongs. In this procedure, searching can be effected. By the method based on the absolute starting time, the user can know the absolute starting time from the desired program number and therefore, can sense a specific item of PIF data by searching for the ATMB corresponding to the absolute starting time.

PINF indicates program attributes. The program attributes, which are allocated to each program, include a copy disable flag (CPNH), a program type (PTYPE), a write attribute (PWRT), and the number of GOPs forming a data unit (SGDU). If the CPNH is set at 1, it means copy disable and if it is set at 0, it means copy enable. The PTYPE, which consists of three bits, indicates such types as the home video, movie, music, kara-OK, computer graphics, interactive use, game, computer data, or program. When the PWRT has a value of 1, it means write enable.

The PIF also includes the parameters as shown in FIG. 4B, in which AINF indicates the identification of a speech encoding system, VINF denotes the identification of an image encoding system, ATRT represents the picture attributes (i.e., information for identifying the aspect ratio and a system such as the PAL or the NTSC system), and HRES and VRES indicate the information on horizontal resolution and vertical resolution, respectively.

PNTB indicates a start pointer that has a value indicating the DAT address (data unit number) at which the data unit at the program starting point is stored. An explanation of DAT will be given below. Once the DAT address (data unit number) has been determined, the position of the start sector of a program on the data area can be determined.

PGML indicates the program number to be processed immediately after the current program is finished, when related programs are present. Namely, the order in which programs are produced does not necessarily coincide with the order of programs numbers. When the current program is the last program, there is no link destination and all bits of the PGML have 1 s.

FIG. 4C shows the structure of the DAT. In this table, there are such parameters as a zone number (NZON), a sector number (NSCT), and a track number (NTRC) on a disk, as well as a program time (PTMB), and a link pointer (PNTL). From the zone number, the track number, and the sector number, the recording sector at the start of the data unit can be determined.

NZON is the zone number to which the recording sector at the start of the data unit belongs. The disk is divided into tracks radially from the innermost circumference, and the zone numbers are allocated in sequence. Specifically, as shown in FIG. 5A, the data area has a reference position R1 on the disk and the number begins with 0 at this position. A zone consists of many tracks. NSCT indicates a sector number in the track. The sector number is not a serial number associated with another track or zone but a number complete only in the track. NTRC indicates a track number in the zone. PTMB is a flag representing the temporal position information on the image data (I picture) at the start of the data unit. The position information indicates a relative elapsed time (in seconds) from the program starting point. The temporal position information is used in searching for time codes explained earlier. Further, the temporal position information is taken in by the reproduction apparatus, which uses it as the start reference data in order to display the program time, absolute time, remaining time, etc.

PNTL is a flag showing a subsequent DAT unit number immediately following the present DAT unit number in time. The unit corresponds to the data unit number. When there is no link destination at the program end, all bits are set at 1 (=0×FFFF). The effective value for the link pointer ranges from 0×0000 to 0×FFFF.

FIG. 5A graphically shows the management area and data area. The blocks in the data area each indicate programs.

FIG. 5B shows an example of the DAT. The DAT unit numbers are continuous in this order: 0 to Nmax. By referring to the PNTB in the PIF, the first DAT unit number is determined. If the DAT unit number is 1, then the next link pointer will be 0. The link pointer of DAT unit number 0 is Nmax −1. The link pointer of DAT unit number Nmax −1 is 2. By checking for the zone number, the sector number, and the track number according to the change of the DAT unit number, it is possible to obtain information on the reproduction order such as track 4 in sector 3 in zone 1, track 7 in sector 2 in zone 0, and track 10 in sector 30 in zone 3.

As described above, the disk in this system contains the management area. In the PIF in the management area, the absolute starting time of the program (ATMB) is recorded. In the DAT, the relative time (program time) (PTMB) of a data unit in the program is recorded.

Therefore, the system of the invention is designed to display various types of time information according to requests by making use of the aforementioned time information.

Figure 6:
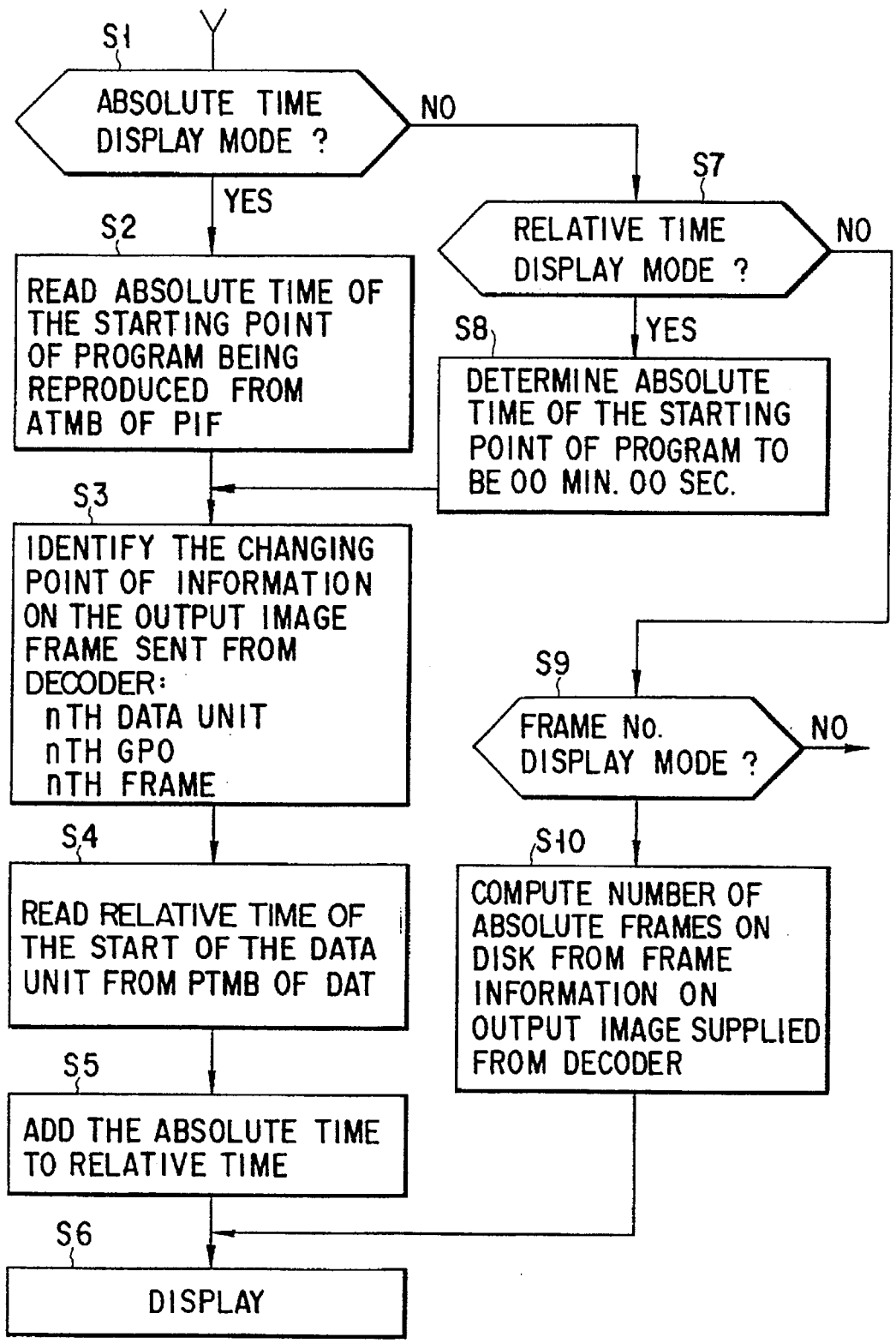
FIG. 6 is a flowchart for the operation of the apparatus of the invention.

FIG. 6 shows the procedure for processing the time information as specified by the user and making a display in the desired form. FIG. 7 graphically shows the time information contained in the PIF and the DAT.

Before a program is reproduced, the reproduction apparatus stores the management information in a work memory when the time display has been specified during or before the reproduction of the program, it is judged whether or not the absolute time display mode has been specified (step S1). When this mode is specified, the absolute time of the starting point of the program currently being reproduced is read from the ATMB in the PIF (step S2) and stored in the work memory. In a decoder (contained in the video processing section), each data unit is decoded and the decoded video signal is supplied. From this signal, the changing point of frames is judged. That is, it is judged where it stands in the order of frames, in what number of the order of GOPs, and in what number of the order of data units.

Because the data unit can be determined on the basis of the judgment, the relative time of the start of the data unit is read from the PTMB in the DAT (step S4). The PTMB in the DAT is the relative time of the start of the data unit as shown in FIG. 7. Then, by adding the absolute time obtained at step S2 to the relative time of the data unit, the absolute time of the data unit is determined. This absolute time is displayed on, for example, a TV monitor.

Then, if the absolute time display mode has not been specified, control is passed from step S1 to S7. At step S7, it is judged whether or not the relative time display mode has been specified. If the relative time has been specified, the absolute time of the beginning of the program now being reproduced is determined to be 00 min. 00 sec., which is then stored in the work memory. Then, control goes to step S3 explained earlier. From this point on, the previously explained steps S4 to S6 are executed. Because the absolute time has been set at 00 min. 00 sec. at the preceding step S8, though the absolute time is added to the relative time of the data unit at step S5, the relative time is eventually displayed.

Next, at step S7, if the relative time display mode has not been specified, control proceeds to step S9. At this step, it is judged whether or not the frame number display mode has been specified. If the frame number display mode has been specified, the number of frames is calculated from the frame information on the output image supplied from the decoder and then the number of absolute frames is determined and displayed (steps S10 and S6). If the frame number display mode has not been displayed, a display of time is not made.

FIG. 8A shows an absolute time representation on the screen, FIG. 8B a relative time representation, and FIG. 8C a frame number representation.

When the number of frames is calculated to display a frame number, the absolute time display data may be used, for example. Specifically, because at step S5, the absolute time of the program being reproduced is determined, the number of data units is determined from this absolute time. Namely, because the data unit has a duration of one second and is given 30 frames, multiplying the absolute time (in seconds)−1 (second) by 30 frames gives the number of frames prior to the data unit currently being reproduced. By adding the frame count data currently being reproduced to the calculation result, the number of the frame being reproduced can be determined. It is also easy to obtain the number of relative frames.

In the above embodiment, the procedure for displaying the elapsed time has been explained. It is also easy to display the remaining time. As explained above, once the data on the absolute time is obtained, the remaining time can be determined by subtracting this absolute time from the absolute time as long as the last data unit. It is also easy to determine the remaining time until one program is finished. For example, during the reproduction of a movie, if there is a time limit, the remaining time can be checked. In this case, the reproduction apparatus is brought in the remaining time display mode.

As has been explained above, with this invention, it is possible to provide a time display according to requests by using the time information recorded on a disk.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus for reproducing data on a disk in which a management area is formed in a portion of the disk and a data area is formed in another portion of the disk, a plurality of programs being recorded in said data area, each of said plurality of programs being composed of a plurality of data units, each of said data units containing video information, said reproduction apparatus comprising:

pickup means for reading the information from said disk;

demodulation means for demodulating the output signal of said pickup means;

management information storage means for storing information output from said demodulation means, including absolute time information stored in said management area and relative time information stored in said management area, said absolute time information indicating a start of each of said programs and said relative time information indicating a start of each of said data units, said relative time information representing a period of time passed from a start of a program;

video decode means for decoding video information output from said demodulation means;

time information processing means for obtaining display information from said information stored in said management information storage means wherein in an absolute time display mode, absolute time display information is calculated on the basis of said absolute time information on a program being reproduced and said relative time information on a data unit being reproduced in the program, in a relative time display mode, relative time display information is calculated on the basis of said relative time information on the data unit being reproduced in the program, and in a frame number display mode, frame display information identifying the present frame number is obtained by counting frame information on the output image; and display means for displaying the display information obtained from said time information processing means.

2. An apparatus for reproducing data on a disk in which a management area is formed in a portion of the disk and a data area is formed in another portion of the disk, a plurality of programs being recorded in said data area, each of said plurality of programs being composed of a plurality of data units, each of said data units containing video information, said reproduction apparatus comprising:

pickup means for reading the information from said disk;

demodulation means for demodulating the output signal of said pickup means;

management information storage means for storing information output from said demodulation means, including absolute time information stored in said management area and relative time information stored in said management area, said absolute time information indicating a start of each of said programs and said relative time information indicating a start of each of said data units, said relative time information representing a period of time passed from a start of a program;

video decode means for decoding video information output from said demodulation means;

means for determining a remaining time for display wherein said remaining time is calculated on the basis of said absolute time information on a program being reproduced and said relative time information on a data unit being reproduced in the program, and wherein the remaining time is determined by subtracting the absolute time information from predetermined time information to represent a period of time from a time when the calculation is performed.

3. An apparatus for reproducing data on a disk in which a management area is formed in a portion of the disk and a data area is formed in another portion of the disk, a plurality of programs being recorded in said data area, each of said plurality of programs being composed of a plurality of data units, each of said data units containing video information, said reproduction apparatus comprising:

pickup means for reading the information from said disk;

demodulation means for demodulating the output signal of said pickup means;

management information storage means for storing information output from said demodulation means, including absolute time information stored in said management area and relative time information stored in said management area, said absolute time information indicating a start of each of said programs and said relative time information indicating a start of each of said data units, said relative time information representing a period of time passed from a start of a program;

video decode means for decoding video information output from said demodulation means;

time information processing means for obtaining display information from said information stored in said management information storage means wherein absolute time display information is calculated on the basis of said absolute time information on a program being reproduced and said relative time information on a data unit being reproduced in the program; and output means for outputting the display information obtained from said time information processing means.

4. An apparatus for reproducing data on a disk in which a management area is formed in a portion of the disk and a data area is formed in another portion of the disk, a plurality of programs being recorded in said data area, each of said plurality of programs being composed of a plurality of data units, each of said data units containing video information, said reproduction apparatus comprising:

pickup means for reading the information from said disk;

demodulation means for demodulating the output signal of said pickup means;

management information storage means for storing information output from said demodulation means, including absolute time information stored in said management area and relative time information stored in said management area, said absolute time information indicating a start of each of said programs and said relative time information indicating a start of each of said data units, said relative time information representing a period of time passed from a start of a program;

video decode means for decoding video information output from said demodulation means;

time information processing means for obtaining display information from said information stored in said management information storage means wherein relative time display information is calculated on the basis of said relative time information on the data unit being reproduced in the program; and output means for outputting the display information obtained from said time information processing means.

5. An apparatus for reproducing data on a disk in which a management area is formed in a portion of the disk and a data area is formed in another portion of the disk, a plurality of programs being recorded in said data area, each of said plurality of programs being composed of a plurality of data units, each of said data units having a plurality of frames containing video information, said reproduction apparatus comprising:

pickup means for reading the information from said disk;

demodulation means for demodulating the output signal of said pickup means;

management information storage means for storing information output from said demodulation means, including absolute time information stored in said management area and relative time information stored in said management area, said absolute time information indicating a start of each of said programs and said relative time information indicating a start of each of said data units, said relative time information representing a period of time passed from a start of a program;

video decode means for decoding video information output from said demodulation means;

time information processing means for obtaining display information from said management information storage means wherein frame display information identifying a present frame number is calculated by multiplying said absolute time information on a program being reproduced by a predetermined frame number to obtain a first value, and adding said first value to the number of frames on a data unit being reproduced to identify a present frame number; and output means for outputting the display information obtained from said time information processing means.

6. The apparatus according to claim 5 wherein said time information processing means sets the first value at 0 when a relative frame number is desired.

* * * * *